United States Patent [19]

Orsing

[11] 4,095,957

[45] Jun. 20, 1978

[54] FUEL ELEMENT

[76] Inventor: John Harry Orsing, Avangsgatan 2, Raa, Sweden

[21] Appl. No.: 780,136

[22] Filed: Mar. 22, 1977

[51] Int. Cl.² ...................... C10L 11/00; B65D 65/00
[52] U.S. Cl. .......................................... 44/40; 44/38; 206/497
[58] Field of Search .................. 44/40, 38; 206/497

[56] References Cited

U.S. PATENT DOCUMENTS

| | | | |
|---|---|---|---|
| 3,351,443 | 11/1967 | Gramm et al. | 44/40 |
| 3,651,596 | 3/1972 | Orsing | 44/40 |
| 3,846,086 | 11/1974 | Balch et al. | 44/40 |

*Primary Examiner*—Carl F. Dees

[57] ABSTRACT

A fuel element is provided for grilling or imparting a smoked flavor to food, comprising a porous noncombustible fibrous casing; a combustible fuel in solid form enclosed within the casing; the fibrous casing having pores in sufficient number and size to permit the entry of a volume of air necessary to support combustion of the fuel, while retaining therein the fuel and substantially all of the combustion residue therefrom; and a combustible fluid in an amount to ignite the fuel; the casing and contents thereof being wholly enclosed in an evacuated envelope of substantially gas- and liquid-impermeable sheet material retaining therewithin the fuel and combustible fluid.

10 Claims, 2 Drawing Figures

FUEL ELEMENT

Orsing, U.S. Pat. No. 3,651,596, patented Mar. 28, 1972, provides a fuel element for grilling or imparting a smoked flavor to food, comprising a porous noncombustible glass fiber casing, and a combustible fuel in solid form enclosed within the casing, the glass fiber casing having pores in a sufficient number and size to permit the entry of a volume of air necessary to support combustion of the fuel, while retaining therewithin the fuel and substantially all of the combustion residue therefrom. This fuel element is quite easy to handle and use, much easier than ordinary crushed charcoal, which is the fuel commonly used in outdoor grilles and open hearths. The fuel element provides an appropriate amount of combustible fuel, and can be used in multiple units as required for a given cooking and/or smoke flavoring operation. The combustion residues are retained within the casing together with any unburned fuel, and the entire element can be discarded when the cooking is finished, leaving virtually no residues to clean up.

It is frequently desirable to provide the combustible fuel in particulate form, ranging in size from a very fine powder to coarse granular form. The fuel is ignited by spraying the fuel with the igniter fluid, such as lighter fluid. The combustible fluid is sprayed over the fuel cartridge, in order to impregnate the fuel, immediately before it is lit.

Since the casing in which the fuel is packaged is open to the atmosphere, the fuel can absorb moisture and become wet, so wet that it does not ignite readily. Moreover, fine powders can seep out through the pores of the casing, with the result that the casing and the immediate surroundings can become covered with, for example, a fine layer of charcoal or coal dust.

In accordance with the present invention, these difficulties are avoided by enclosing the entire fuel element, including the casing and fuel, in a wrapper of nonporous substantially gas and liquid-impermeable plastic sheet material, which is hermetically sealed. This not only eliminates exchange between the contents of the fuel element casing with the atmosphere, but it also makes it possible to combine with the fuel a combustible fluid that can serve as the igniter fluid in the amount required to ignite the element. Since the combustible fluid is retained within the wrapper with the fuel, it becomes uniformly distributed throughout the fuel, with the result that all of the fuel can be ignited at once, and the difficulty of getting a fire started uniformly is eliminated.

The invention accordingly provides a fuel element for grilling or imparting a smoked flavor to food, comprising a porous noncombustible fibrous casing; a combustible fuel in solid form enclosed within the casing, the fibrous casing having pores in sufficient number and size to permit the entry of a volume of air necessary to support combustion of the fuel, while retaining therein the fuel and substantialy all of the combustion residue therefrom; and a combustible fluid in an amount to ignite the fuel, the casing and contents thereof being wholly enclosed in an evacuated envelope of substantially gas — and liquid-impermeable sheet material retaining therewithin the fuel and combustible fluid.

A preferred embodiment of the fuel element of the invention is shown in the drawings, in which.

Figure 1:
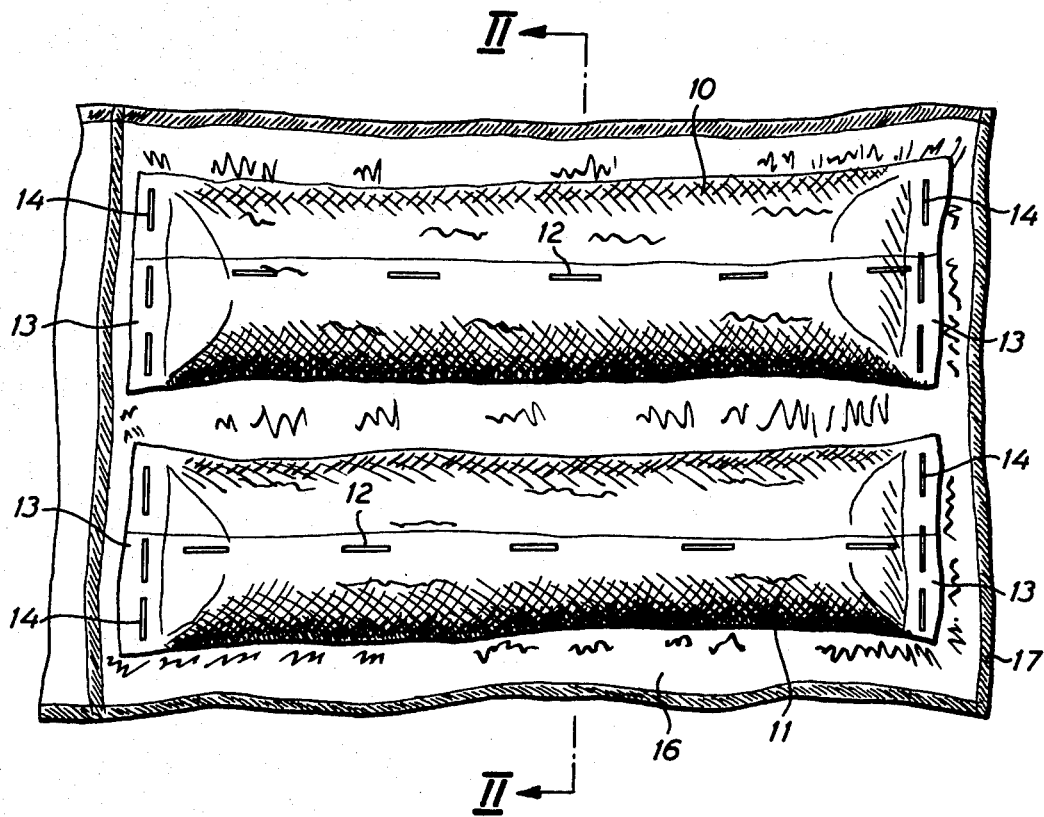
FIG. 1 is a top view of an envelope hermetically sealing therewithin two fuel elements in accordance with the invention.

The fuel elements 10, 11 shown in the drawings each have a porous fibrous casing made of a nonwoven glass fiber fabric, formed by felting a thin layer of glass fibers, and binding the fibers together in the layer by impregnation of the layer with a binder. The nonwoven fabric is folded in a tubular shape, and retained in this shape by the staples 12, and the ends 13 are flattened and held together by a further row of staples 14, retaining within the casing a granular charcoal fuel 15, whose particles range in size from a powder to coarse granules. The fuel 15 is impregnated with a combustible fluid such as igniter fluid.

Figure 2:
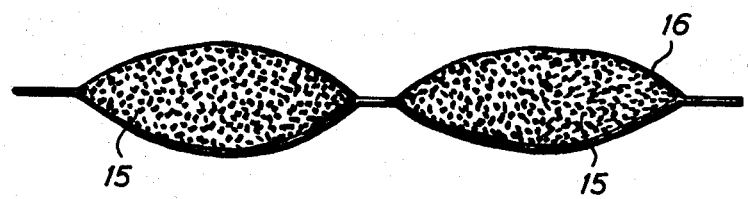
FIG. 2 is a cross-sectional view taken along the lines II-II of FIG. 1.

Retaining both the fuel and the combustible fluid within the casing is an enclosing envelope of nonporous gas- and fluid-impermeable inert flexible plastic sheet material 16, preferably of heat-sealable or thermoplastic material, such as polyethylene, polypropylene, polyvinyl chloride or polyvinylidene chloride. The envelope is made of two superimposed sheets of thermoplastic film, sandwiching the fuel element therebetween, and sealed together at their periphery 17 on all four sides. Before the heat-sealing is completed, the envelope 16 is evacuated. This is preferably done by introducing the sandwich structure in a sealed vaccum chamber which is evacuated to a vacuum of about 5 mm of mercury, the heat-sealing being completed within said chamber, so that the envelope is drawn tightly against the fuel elements 10, 11, holding them together in a snug package, as seen in FIG. 2, when the completed fuel element is taken out from the vacuum chamber. Thus, there is no space between the envelope and the nonwoven glass fiber casing. This retains the igniter fluid within the casing, and ensures that it will become uniformly distributed throughout the fuel.

In use, the casing 16 is cut or torn open, and peeled away, exposing the fuel elements. The fuel elements can then be placed in a grille, and ignited. The igniter fluid will light immediately, and the entire cartridge will start to burn at once, because the igniter fluid is uniformly distributed throughout the fuel. Thus, within moments after lighting, the cooking and/or smoking can begin.

Both elements can be used at once, or the envelope can be peeled away from one element at a time, the second element being tossed on to the fire when the first element has been nearly entirely burned out. More than two fuel elements can be included in the same package, of course, if desired.

Any of the fuel elements described in U.S. Pat. No. 3,651,596 can be packaged in the manner described in this invention. The fuel can for example be charcoal, coal, wood particles such as sawdust or wood chips, and coke. Any size particles can be used, ranging from powdered materials to rather large pieces, such as coal chunks.

The porous fibrous casing for the fuel is of noncombustible fibrous material, so that it remains to retain the combustion residues following the cooking. Glass fibers are particularly useful, and are preferred, but other nonflammable fibrous materials can be used, which are not melted at the combustion temperature, including asbestos, polytetrafluoroethylene, mineral wool, and metal wire. Woven and nonwoven fibrous sheet materials can be used.

The nonporous gas- and liqud-impermeable plastic of material for the envelope of the invention can be any inert flexible plastic sheet material, particularly thermoplastic materials, which are readily heat sealed to form an hermetic seal. Examples of thermoplastic materials include polyolefins such as polyethylene, polypropylene, polyisobutylene and polyisopentylene, polyamides, polyvinyl chloride, polyvinylidene chloride, polyesters such as copolymers of terephthalic acid and ethylene glycol and polyacrylonitrile. Nonthermoplastic sheet materials can also be used, such as cellophane (regenerated cellulose), and rubber hydrochloride. Since the wrapper is removed and discarded before the contents are burned, it forms no part of the combustible fuel element.

Any combustible fluid can be used as the igniter fluid but preferably the igniter fluid has a flash point over 30° C and is of a type which is substantially odorless, and does not form aromatic or explosive vapors. A convenient igniter fluid is isododecane, having a flash point of about 42° C, because it has no tendency of self-ignition and does not form explosive vapors. Other petroleum products such as the available igniter fluids of the type used for igniting charcoal in grilles, which are odorless and do not produce odorous or explosive vapors, can be used. Such igniter fluids usually comprise a mixture of hydrocarbons, such as paraffins, and have a flash point of the order of 60° C.

The envelope can be made in any suitable shape. It is convenient, for mass production of the packaged fuel element, to bring together two sheets of the wrapper material on each side of the fuel elements, and heat-seal the sheets together about the periphery of the fuel element or elements to be packaged therewithin, as shown in the drawings. It is also feasible to use an endless tube of the wrapper material, heat-seal the tube all the way across, cut off a section of the tube, fill the fuel elements in the tube section, and then heat-seal the open end, to enclose and complete the package. Other variations will be apparent to those skilled in the art. Before heat-sealing, the package is evacuated, taking care not to draw off the igniter fluid at the same time, before the package is sealed.

Having regard to the foregoing disclosure, the following is claimed as the inventive and patentable embodiments thereof:

1. A fuel element for grilling or imparting a smoked flavor to food, comprising a porous noncombustible glass fiber casing; a combustible fuel in solid form enclosed within the casing; the casing having pores in a sufficient number and size to permit the entry of a volume of air necessary to support combustion of the fuel, while retaining therein the fuel and substantially all of the combustion residue therefrom; and a combustible fluid in an amount to ignite the fuel; the casing and the fuel and fluid contents thereof being wholly enclosed in an evacuated wrapper of substantially gas- and liquid-impermeable sheet material, the wrapper retaining therewith the combustible fuel and combustible fluid.

2. A fuel element in accordance with claim 1 in which the porous noncombustible casing is of nonwoven glass fiber sheet material.

3. A fuel element in accordance with claim 2 in which the glass fiber is an unwoven felt bonded by a starch-containing bonding agent.

4. A fuel element in accordance with claim 1, in which the casing is a woven glass fiber fabric.

5. A fuel element in accordance with claim 1, in which the fuel is charcoal.

6. A fuel element in accordance with claim 5, comprising in addition wood chips for generating smoke during combustion to produce a smoked flavor in the food.

7. A fuel element in accordance with claim 1, in which the fuel comprises wood chips for generating smoke during combustion to produce a smoked flavor in the food.

8. A fuel element in accordance with claim 1, in which the gas- and liquid-impermeable sheet material is thermoplastic.

9. A fuel element in accordance with claim 8, in which the gas- and liquid-impermeable sheet material is polyethylene.

10. A fuel element in accordance with claim 1, in which the wrapper is made of two sheets of thermoplastic sheet material, sandwiching the casing and contents therebetween, and heat-sealed together about their periphery.

* * * * *